United States Patent
Ragupathi et al.

(10) Patent No.: US 9,819,722 B2
(45) Date of Patent: Nov. 14, 2017

(54) SYSTEM AND METHOD FOR CONTROLLING AN INFORMATION HANDLING SYSTEM IN RESPONSE TO ENVIRONMENTAL EVENTS

(71) Applicant: DELL PRODUCTS, L.P., Round Rock, TX (US)

(72) Inventors: Dinesh Kunnathur Ragupathi, Round Rock, TX (US); Hasnain Shabbir, Round Rock, TX (US); Arun Muthaiyan, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 177 days.

(21) Appl. No.: 14/580,445

(22) Filed: Dec. 23, 2014

(65) Prior Publication Data

US 2016/0182338 A1   Jun. 23, 2016

(51) Int. Cl.
*H04L 12/26* (2006.01)
*H04L 29/08* (2006.01)
*H04L 12/24* (2006.01)

(52) U.S. Cl.
CPC .......... *H04L 67/02* (2013.01); *H04L 41/0816* (2013.01); *H04L 41/0856* (2013.01)

(58) Field of Classification Search
USPC .......................... 709/224; 701/36, 29.1, 32.4
See application file for complete search history.

(56) References Cited

U.S. PATENT DOCUMENTS

| | | | |
|---|---|---|---|
| 6,361,752 B1 * | 3/2002 | Demarest | A61L 9/037 165/104.26 |
| 6,661,210 B2 | 12/2003 | Kimball et al. | |
| 6,737,840 B2 | 5/2004 | McDonald et al. | |
| 7,035,765 B2 | 4/2006 | Tanahashi | |
| 7,282,900 B2 | 10/2007 | Oswald et al. | |
| 7,352,159 B2 | 4/2008 | Luo et al. | |
| 7,498,783 B2 | 3/2009 | Johnson | |
| 7,600,146 B2 | 10/2009 | Liccione et al. | |
| 8,117,493 B1 * | 2/2012 | Fultz | G06F 11/2028 714/6.23 |
| 8,358,115 B2 | 1/2013 | Luo et al. | |
| 8,541,993 B2 | 9/2013 | Notman et al. | |
| 8,674,823 B1 * | 3/2014 | Contario | H02J 1/10 340/333 |
| 8,849,505 B2 * | 9/2014 | Menard | B60J 7/0573 307/9.1 |

(Continued)

Primary Examiner — Jude Jean Gilles
(74) Attorney, Agent, or Firm — Isidore PLLC

(57) ABSTRACT

A method and information handling system (IHS) for controlling an IHS in response to an environmental event includes a management controller dynamically polling at least one environmental event source for environmental event data. The environmental event data is received from the environmental event source. A first environmental event value is identified within the environmental event data. The method further includes determining if the first environmental event value is outside of a threshold specification. In response to the first environmental event value being outside of the threshold specification, a first action associated with the first environmental event value is identified. The IHS is triggered to perform the first action.

20 Claims, 6 Drawing Sheets

(56) References Cited

U.S. PATENT DOCUMENTS

| | | | |
|---|---|---|---|
| 2004/0236676 A1* | 11/2004 | Takezawa | G06Q 40/025 |
| | | | 705/38 |
| 2005/0283636 A1 | 12/2005 | Vasudevan et al. | |
| 2007/0156536 A1* | 7/2007 | Alfandary | G06Q 20/203 |
| | | | 705/22 |
| 2007/0174657 A1 | 7/2007 | Ahmadian et al. | |
| 2008/0265683 A1 | 10/2008 | Zhu et al. | |
| 2009/0024663 A1* | 1/2009 | McGovern | G06F 21/577 |
| 2009/0271445 A1* | 10/2009 | Emaru | G06F 11/2069 |
| 2012/0154145 A1 | 6/2012 | Anson et al. | |
| 2013/0027009 A1 | 1/2013 | Tang et al. | |
| 2014/0201569 A1 | 7/2014 | Radhakrishnan | |

\* cited by examiner

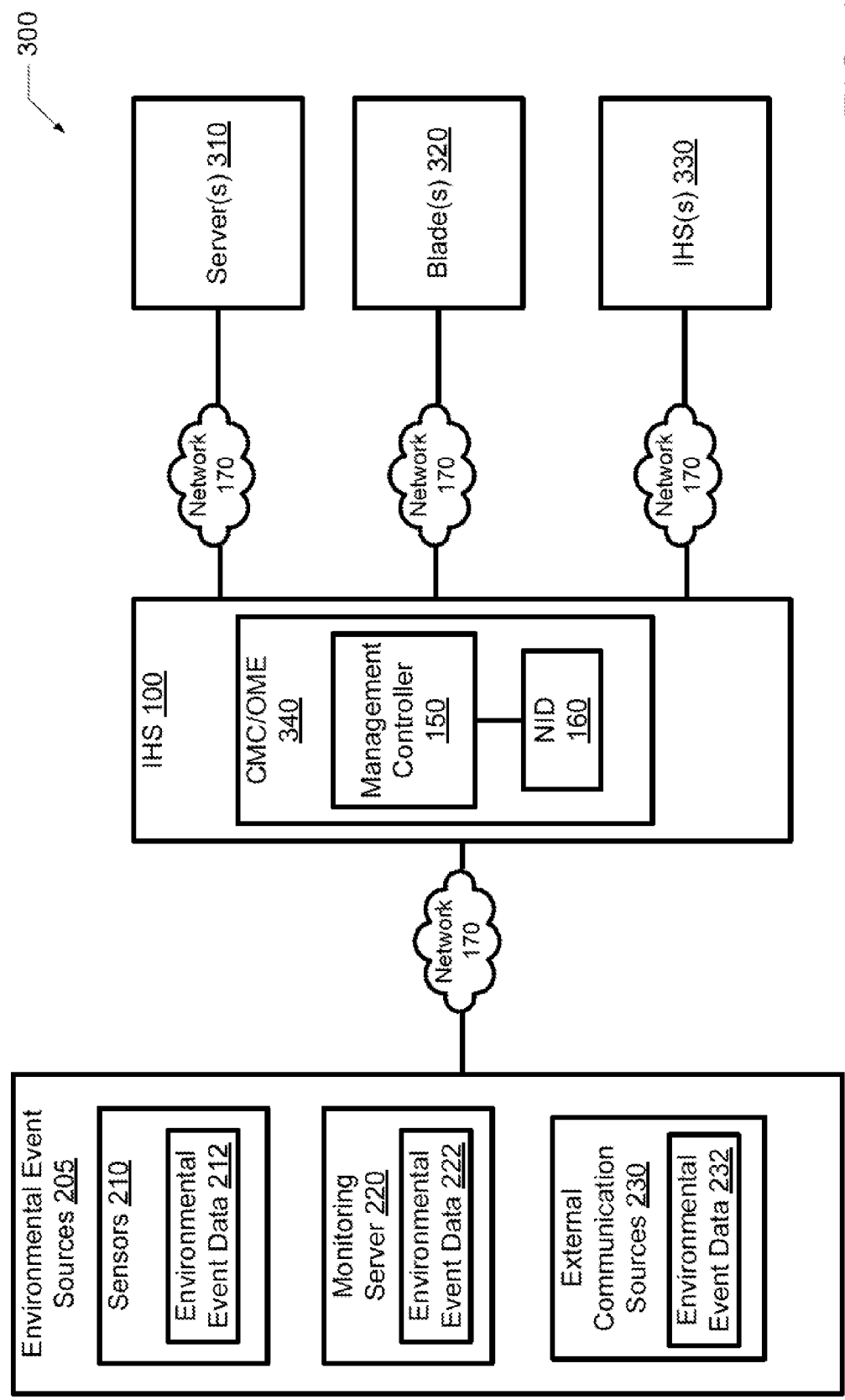

FIG. 4

ENVIRONMENTAL EVENT SOURCE DATA 410

| SOURCE ID 412 | SOURCE NAME 414 | SOURCE LOCATOR 416 | AUTHEN. DATA 418 |
|---|---|---|---|
| S101 | GOOGLE NEST | GOOGLE NEST URL | T764J |
| S102 | WEATHER.COM | EVENT SUBSCRIPTION URL | ZG954 |
| S103 | CENTRAL MONITORING SERVER | IP: 192.68.01 | KP103 |
| S104 | TEMPERATURE SENSOR | PORT 1011 | BA405 |

ENVIRONMENTAL EVENT ACTION DATA 430

| SOURCE ID 412 | EVENT ID 434 | EE NAME 436 | EE VALUE 438 | THRESHOLD 440 | EE ACTION 442 |
|---|---|---|---|---|---|
| S101 | E100 | AC FAILURE | ROOM TEMP = 92 | ROOM TEMP > 90 | THROTTLE POWER, SEND ALERT |
| S102 | E200 | FLOOD | FLOOD FORECAST | FLOOD FORECAST | BACKUP, SHUTDOWN |
| S103 | E300 | TORNADO | TORNADO FORECAST | TORNADO FORECAST | BACKUP, SHUTDOWN |
| S104 | E400 | FAN FAILURE | INTERNAL TEMP = 105 | INTERNAL TEMP > 100 | BACKUP, SHUTDOWN |

- APPs 112
- O/S 114
- BIOS/UEFI 116
- F/W 118
- CONFIGURATION SOFTWARE 450

110

180

SYSTEM AND METHOD FOR CONTROLLING AN INFORMATION HANDLING SYSTEM IN RESPONSE TO ENVIRONMENTAL EVENTS

BACKGROUND

1. Technical Field

The present disclosure generally relates to information handling systems and in particular to a system and a method for controlling an information handling system in response to environmental events.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems in an enterprise (i.e., a business, corporation or government agency) typically operate in a distributed environment over a geographical area. Information handling systems can include a collection of servers, storage devices, desktops and laptops all in communication via local area networks (LANs), wide area networks (WANs) or other networks such as the internet. The continuous availability of the information handling system is vital to the enterprise's operation.

If an emergency event or disaster occurs in one or more locations of the information handling system, data within the information handling system may be lost or the information handling system may be damaged. Examples of emergency events or disasters include fires, floods, hurricanes, tornadoes, earthquakes, cooling failures and power failures. Unfortunately, when an emergency event or disaster occurs, there is frequently little notice or advanced warning of the coming incident. In an emergency event or disaster situation, there is insufficient time to take action to protect the information handling system from the loss of data and damage.

BRIEF SUMMARY

Disclosed is a method and information handling system (IHS) for controlling an IHS in response to an environmental event.

According to one embodiment, a method for controlling an IHS in response to an environmental event is disclosed. The method includes a management controller dynamically polling at least one environmental event source for environmental event data. The environmental event data is received from the environmental event source. A first environmental event value is identified within the environmental event data. The method further includes determining if the first environmental event value is outside of a threshold specification. In response to the first environmental event value being outside of the threshold specification, a first action associated with the first environmental event value is identified. The IHS is triggered to perform the first action.

According to another embodiment, an IHS includes a management controller. The management controller has firmware executing thereon to enable control of the IHS in response to an environmental event. The firmware configures the management controller to dynamically poll at least one environmental event source for environmental event data and to receive the environmental event data from the environmental event source. The management controller identifies a first environmental event value within the environmental event data and determines if the first environmental event value is outside of a threshold specification. In response to the first environmental event value being outside of the threshold specification, the management controller identifies a first action associated with the first environmental event value and triggers the IHS to perform the first action.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3 illustrates another example control system that is expanded to include control of secondary devices, according to one or more embodiments;

FIG. 4 illustrates example contents of a system memory that includes software and firmware to support control of the IHS, in accordance with one embodiment;

DETAILED DESCRIPTION

The illustrative embodiments provide a method and information handling system (IHS) for controlling an IHS in response to an environmental event.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
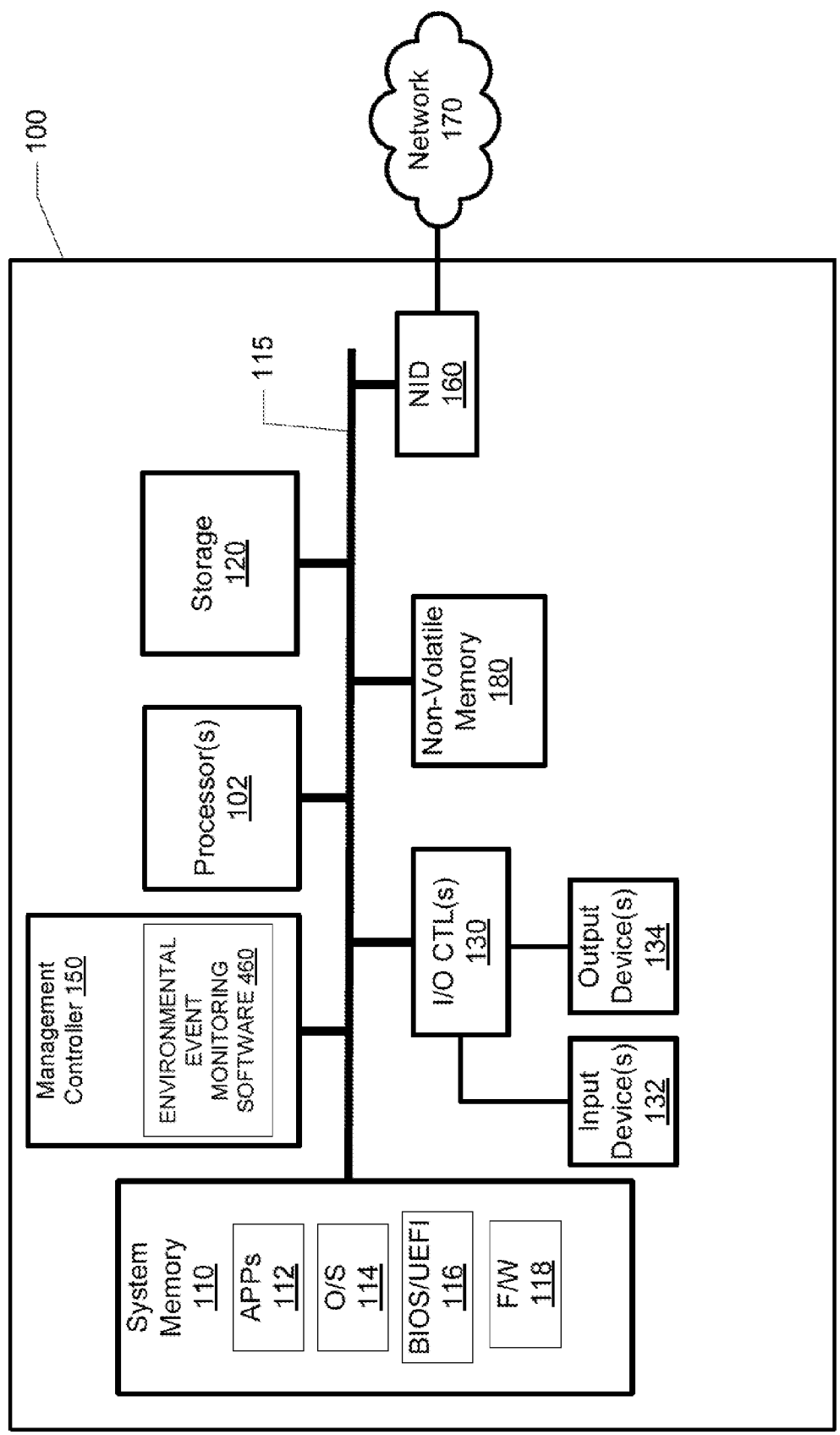
FIG. 1 illustrates one example of an information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processors, such as processor 102. Processor 102 is coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100. As shown, system memory 110 can include therein a plurality of software and/or firmware modules including application(s) 112, operating system (O/S) 114, BIOS/UEFI 116 and firmware (F/W) 118. In one or more embodiments, BIOS/UEFI image 116 comprises the additional functionality associated with unified extensible firmware interface (UEFI) and can include UEFI images and drivers. The various software and/or firmware modules have varying functionality when their corresponding program code is executed by processor 102 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s).

IHS 100 further includes a management controller 150 (or management processor) coupled to system interconnect 115. Management controller 150 monitors and controls the operation of IHS 100 and other systems and devices communicatively coupled to IHS 100. Management controller 150 can also perform configuration and remote control of other connected IHSs. Management controller 150 is also coupled to system memory 110 via system interconnect 115. Certain specific software and/or firmware modules stored in system memory 110 can be executed by management controller 150. In one or more embodiments, management controller 150 is attached to the motherboard of the IHS, and management controller 150 includes specific firmware that enables management controller 150 to perform the various control functions described herein.

Management controller 150 includes environmental event monitoring software module 460, which controls at least one of IHS 100, or other distributed computing devices in response to environmental events. Environmental event monitoring module 460 is a software and/or firmware module that is executed by management controller 150.

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprises multiple devices located across a distributed network, and NID 160 enables IHS 100 to be connected to these other devices. Network 170 can be a local area network, wide area network, personal area network, and the like, and the connection to and/or between network and IHS 100 can be wired or wireless or a combination thereof. For purposes of discussion, Network 170 is indicated as a single collective component for simplicity. However, it is appreciated that network 170 can comprise one or more direct connections to other devices as well as a more complex set of interconnections as can exist within a wide area network, such as the Internet. IHS 100 further comprises a persistent or non-volatile memory (NVM) 180 that is coupled to system interconnect 115. NVM 180 can store a variety of data and information.

In one embodiment, IHS 100 is configured as a control/management platform and comprises a chassis management controller (CMC) or an open manage essentials system manager (OME) that includes at least one management controller 150 and NID 160 in order to communicate with other external devices such as servers and/or blades. Both the CMC and OME provide secure remote management access to remotely connected devices and systems.

Figure 2:
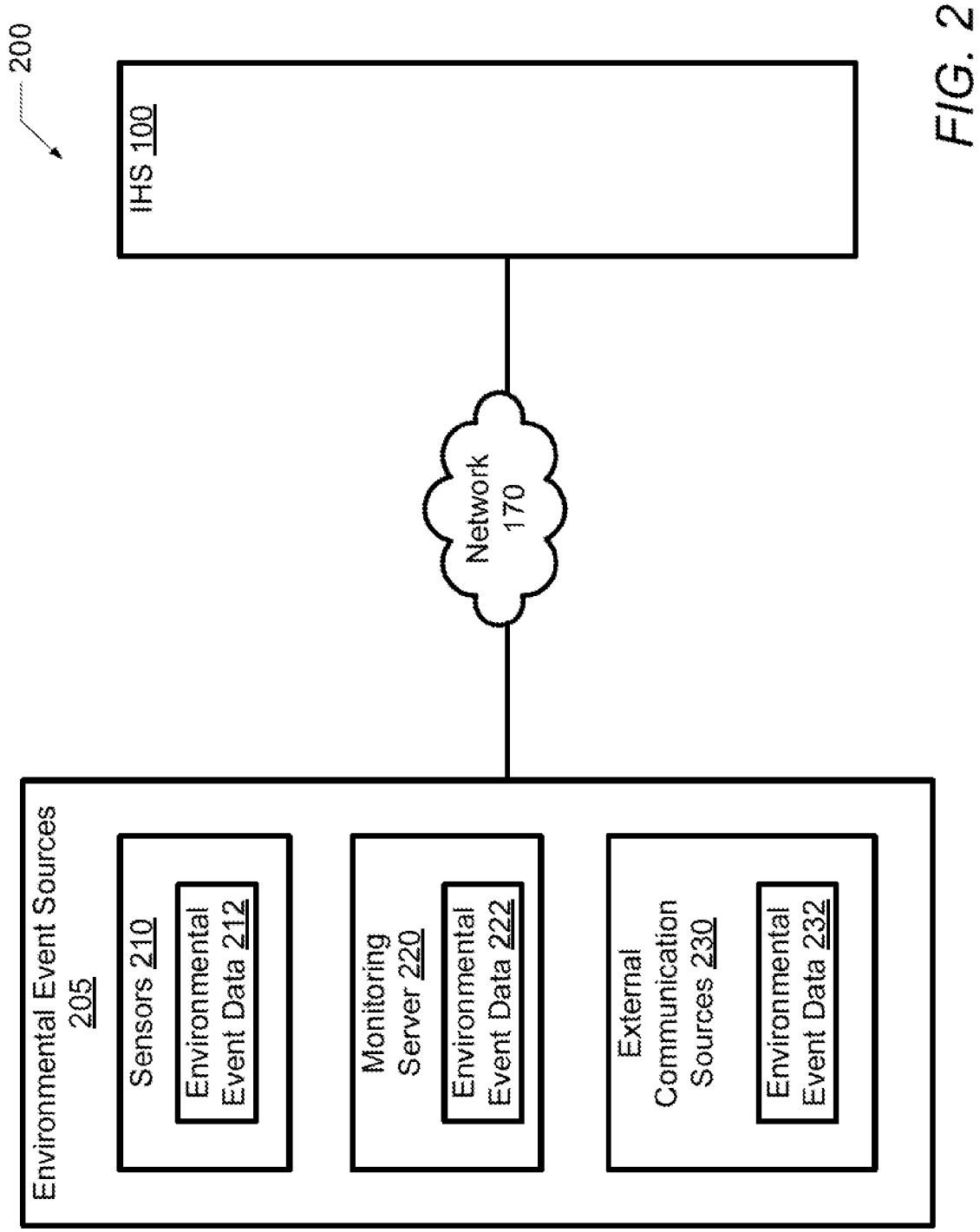
FIG. 2 illustrates an example control system, including several sources of environmental events, according to one or more embodiments.

Referring to FIG. 2, one embodiment of a control system 200 is shown. Control system 200 includes several environmental event sources 205 that are communicatively coupled to IHS 100 via network 170. Environmental event sources 205 include sensors and monitoring devices 210, monitoring server 220 and external communication source 230. Sensors and monitoring devices 210 monitor and record various environmental event data 212 at their respective locations. In one embodiment, sensors and monitoring devices 210 can include a temperature sensor, water sensor, a fire alarm, a power meter and/or an audio meter, among others. Sensors and monitoring devices 210 can transmit environmental event data 212 to IHS 100. For example, sensor 210 can be temperature sensor that measures the temperature inside a building where IHS 100 is located.

The environmental event data 212 can be communicated between environmental event sources 205 and IHS 100 using a variety of transmission protocols. In one embodiment, the environmental event data 212 can be communicated using an intelligent platform management interface (IPMI) via a user datagram protocol (UDP). The IPMI specifies a software component in terms of its operations, their inputs and outputs and underlying types.

Environmental event sources 205 further include external communication sources 230. External communication sources 230 provide information regarding weather, emergency and disaster related events for an area or location. In one embodiment, external communication sources 230 can be news feeds, internet weather services, an emergency broadcast system and/or an electric utility web site. Environmental event sources 230 can transmit environmental event data 232 to IHS 100.

The environmental event data 232 can also be communicated between environmental event sources 205 and IHS 100 using a variety of transmission protocols. In one embodiment, the environmental event data 232 can be communicated using an IPMI. In another embodiment, the environmental event data 232 can be communicated using extensible markup language (XML). XML is a language that defines a set of rules for encoding documents in a format which is both human-readable and machine-readable. For example, a world wide web based weather forecasting service can be polled for XML coded environmental event data 232 for the location of IHS 100.

Environmental event sources 205 further include a monitoring server 220. Monitoring server 220 monitors, receives, and collects environmental event data 222 from several sources such as sensors 210 and external communication sources 230. Monitoring server 220 aggregates the environmental event data from sensors 210 and external communication sources 230. Monitoring server 220 serves as a single source for communicating environmental event data 222 to one or more IHS 100. Monitoring server 220 can transmit environmental event data 222 to IHS 100.

Referring to FIG. 3, another embodiment of a control system 300 is shown. Control system 300 includes several environmental event sources 205 that are communicatively coupled to IHS 100 via network 170. The environmental event sources 205 of FIG. 3 are the same as the environmental event sources 205 of FIG. 2.

IHS 100 is further in communication with several other distributed computing devices or systems. As illustrated, IHS 100 is communicatively coupled to one or more servers 310 via network 170. In one embodiment, servers 310 can be located in the same data center as IHS 100. In another embodiment, servers 310 can be any number of servers (e.g., from a few servers to hundreds of servers) that are located in a plurality of (various) different physical locations.

IHS 100 is also in communication with several blades or blade servers 320 via network 170. As with servers 310, the number of blades 320 can vary, and blades 320 can be located in the same data center as IHS 100, in one embodiment, or can be located in a plurality of different physical locations.

IHS 100 is also communicatively coupled to one or more secondary IHS 330 via network 170. In one embodiment, secondary IHS 330 can be located in the same data center as IHS 100. In another embodiment, secondary IHS 330 can be located in a plurality of different physical locations. For example, in a governmental enterprise, IHS 100 could be located in a state capital and secondary IHS 330 could be located in each major city in a state. As shown in FIG. 3, IHS 100 can include a CMC or OME 340 with at least one management controller 150 and NID 160 that are in communication with servers 310 and blades 320 via network 170. The CMC and/or OME 340 provide secure remote management access to servers 310 and blades 320.

With reference now to FIG. 4, one embodiment of example contents of system memory 110 and NVM 180 of IHS 100 is shown. In the description of FIG. 4, reference is also made to specific components illustrated within the preceding FIGS. 1-3. System memory 110 stores data, software, and/or firmware modules including application(s) 112, operating system (O/S) 114, BIOS/UEFI 116 and firmware (F/W) 118. NVM 180 stores environmental event source data 410 and environmental event action data 430.

Environmental event source data 410 includes data about and/or from environmental event sources 205, such as, but not limited to, sensors and monitoring devices 210, monitoring servers 220 and external communication sources 230. Environmental event source data 410 includes a source identifier 412, a source name 414, a source locator 416 and authentication data 418. Source identifier 412 is associated with the source name 414. The source locator 416 is the location where the environmental event data originates from. In a local computing environment, source locator 416 can be a port address. In a distributed computing environment, source locator 416 can be an internet protocol (IP) address or a uniform resource locator (URL) address. Authentication data 418 are passcodes or security data that confirm that communications sent to and received from the environmental event sources are authentic.

Environmental event action data 430 includes source identifier 412, an event identifier 434, an environmental event name 436, an environmental event value 438, an environmental event threshold specification 440 and an environmental event action 442. Event identifier 434 identifies each unique occurrence of an event that is received from the environmental event source identified by source identifier 412. Environmental event name 436 is the name associated with each specific environmental event that is received by IHS 100. One example of an environmental event name 436 can be an AC failure where any one of IHS 100, servers 310, blades 320 or secondary IHS 330 are located.

The environmental event names 436 can included a wide variety of specific environmental events, such as a power failure, a flood, a tornado, a hurricane, a cooling system failure, a storm warning, a fire and an earthquake. Environmental event value 438 is the value or measurement of the specific environmental event that is received from the environmental event sources. For example, in FIG. 4, the environmental event value 438 corresponding to event identifier E100 is a room temperature of 92 degrees Fahrenheit at the location where a specific one of IHS 100, servers 310, blades 320 or secondary IHS 330 is located.

Threshold specification or action trigger 440 is the threshold environmental event value that triggers an environmental event action 442. The environmental event value 438 can be either greater than or less than or outside the threshold specification 440. For example, in FIG. 4, the environmental event value 438 of room temperature of 92 degrees Fahrenheit is greater than the threshold specification 440 of 90 degrees Fahrenheit, triggering an environmental event action 442 such as (i) throttling power to at least one of IHS 100, servers 310, blades 320 or secondary IHS 330 and/or (ii) sending an alert or warning. In at least one embodiment, the receipt of an environmental event value 438 can automatically trigger an environmental event action. For example, if the environmental event value 438 is the forecast of a tornado, the environmental event action 442 of backing up data and shutting down the affected device (i.e., the device in the particular geographic location) is triggered. The environmental event action 442 can be a wide variety of actions such as throttling power to the IHS, backing up data of the IHS, shutting down the IHS, migrating the IHS to a secondary IHS, transmitting a warning message, operating the IHS in a maintenance mode, and operating the IHS in a quiet mode.

System memory 110 further stores configuration software module 450 that allows a user to select environmental event sources 205 to be polled for environmental events. Configuration software module 450 further allows a user to select an environmental event action 442 to be performed when an environmental event value reaches a pre-determined threshold. Once selected by the user, the environmental event action 442 is mapped to the particular environmental event and environmental event threshold. The specific mapping is then stored for later access and use by environmental event monitoring software module 460.

Management controller 150 includes environmental event monitoring software module 460, which controls at least one of IHS 100, servers 310, blades 320 or secondary IHS 330 in response to environmental events. Environmental event monitoring module 460 is a software and/or firmware module that is executed by management controller 150. Environmental event monitoring module 460 causes dynamic polling of environmental event sources 205 for environmental event data 212, 222, 232. The environmental event data is received from the environmental event source. An environmental event value 438 is identified within the environmental event data. Management controller 150 determines if the first environmental event value is greater than a pre-determined environmental event threshold value. In response to the first environmental event value being greater than the pre-determined environmental event threshold value 440, an action 442 associated with the first environmental event value is identified from the environmental event action database 430. At least one of IHS 100, servers 310, blades 320 or secondary IHS 330 are triggered to perform the action.

Those of ordinary skill in the art will appreciate that the hardware and software/firmware components and basic configuration depicted in FIGS. 1-4 and described herein may vary. For example, the illustrative components within IHS 100 (FIG. 1) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

Figure 5:
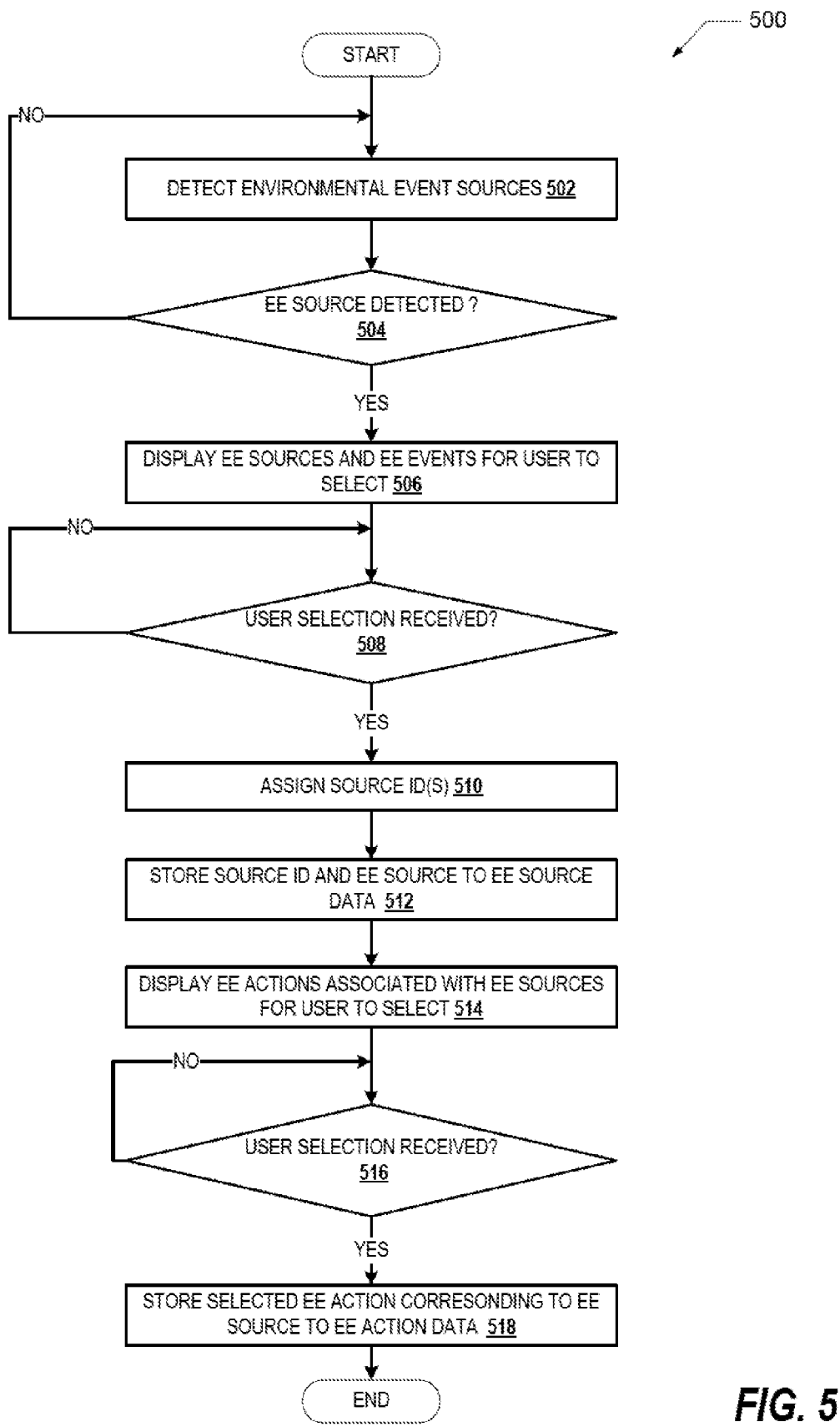
FIG. 5 is a flow chart illustrating one example of a method for selecting environmental event sources and environmental event actions.
Figure 6:
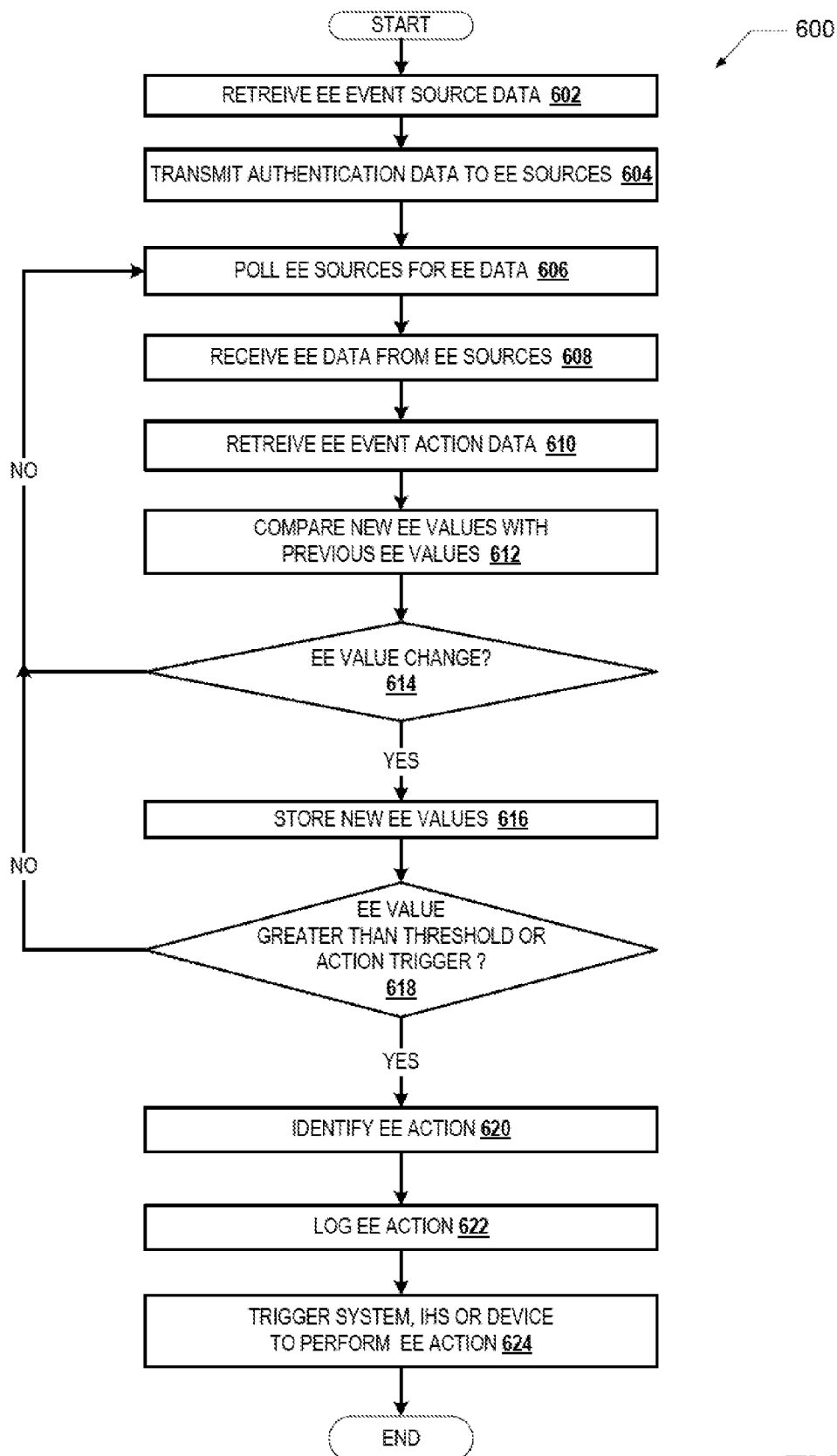
FIG. 6 is a flow chart illustrating one example of a method for controlling an IHS in response to an environmental event.

FIGS. 5 and 6 illustrate flowcharts of exemplary methods 500 and 600 by which management controller 150 within the preceding figures performs different aspects of the processes that enable the one or more embodiments of the disclosure. Generally, method 500 represents a computer-implemented method for selecting environmental event sources and environmental event actions. Method 500 further represents a computer-implemented method for mapping received environment events to environmental event actions. Method 600 represents a computer-implemented method for controlling an IHS and/or distributed computing devices or systems such as servers 310 and blades 320 in response to an environmental event. The description of methods 500 and 600 are provided with general reference to the specific components illustrated within the preceding FIGS. 1-4. Generally, method 500 is described as being implemented via management controller 150 and particularly the execution of code provided by configuration software 450 acting within management controller 150. Generally, method 600 is described as being implemented via management controller 150 and particularly the execution of code provided by environmental event monitoring software 460 acting within management controller 150. It is however appreciated that certain aspects of the described methods may be implemented via other processing devices and/or execution of other code.

Referring now to the flow chart of FIG. 5, method 500 begins at the start block and proceeds to block 502 where management controller 150 detects available environmental event sources 205. The environmental event sources can be detected via network 170 through protocols such as simple network management protocol (SNMP). At decision block 504, management controller 150 determines if one or more environmental event sources 205 have been detected. In response to no environmental event sources being detected, method 500 returns to block 502 to continue detecting environmental event sources. In response to at least one environmental event source being detected, management controller 150 displays the detected environmental event sources 205 and associated environmental events 212, 222, 232 to a user and prompts the user to select which environmental sources and events are to be monitored or polled (block 506).

At decision block 508, management controller 150 determines if the user has selected one or more environmental event sources. In response to the user not selecting any environmental event sources, method 500 continues to wait for user input at block 508. In response to at least one environmental event source being selected, management controller 150 assigns source IDs 412 to the selected environmental event sources 205 (block 510). Management controller 150 stores the source IDs 412 and the environmental event sources 205 to environmental event source data 410 (block 512). Management controller 150 displays the environmental event actions 442 associated with the environmental events to a user and prompts the user to select which environmental event action/s 442 is/are performed in response to receiving notification of a corresponding environmental event from the environmental event source (block 514).

At decision block 516, management controller 150 determines if the user has selected one or more environmental event actions. In response to the user not selecting any environmental event actions, method 500 returns to block 514 to wait for user input. In response to at least one environmental event action being selected, management controller 150 stores the selected environmental event action 442 associated with the corresponding environmental event source to environmental event action data 430. Method 500 then ends.

Referring to the flow chart of FIG. 6, method 600 begins at the start block and proceeds to block 602 where management controller 150 retrieves environmental event source data 410 including the source identifiers 412, source names 414 and source locations 416. Management controller 150 transmits authentication data 418 to the environmental event sources 205 (block 604). The authentication data 418 allows IHS 100 to verify that received environmental event data is authentic. Management controller 150 polls or monitors the environmental event sources 205 for environmental event data 212, 222 and 232 (block 606). For example, a World Wide Web based weather forecasting service can be polled for XML coded environmental event data 232 for the specific location/s at which one or more of IHS 100, servers 310, blades 320, and secondary IHS 330 is/are located.

At block 608, management controller 150 receives the environmental event data 212, 222 and 232 from the environmental event sources 205. Management controller 150 retrieves the environmental event action data 430 (block 610) and compares the recently received environmental event values 438 with previously stored environmental event values 438 (block 612). At decision block 614, management controller 150 determines if the recently received environmental event values 438 are different than the previously stored environmental event values 438. In response to the recently received environmental event values 438 not being different than the previously stored environmental event values 438, method 500 returns to block 606 to continue polling the environmental event sources 205 for environmental event data 212, 222 and 232. In response to the recently received environmental event values 438 being different than the previously stored environmental event values 438, management controller 150 stores the new environmental event values 438 to environmental event action data 430 (block 616).

At decision block 618, management controller 150 determines if at least one of the environmental event values 438 are outside of a pre-determined threshold, specification or action trigger value 440. In one embodiment, the environmental event value 438 can be either greater than or less than the threshold value 440. In at least one embodiment, the threshold value 440 can be the receipt of any environmental event value 438. For example, if the environmental event value 438 is the forecast of a tornado, the forecast itself serves as the threshold and receipt of the forecast triggers the environmental event action 442 of backing up data and shutting down the affected device.

In response to none of the environmental event values 438 being outside of the pre-determined threshold, specification or action trigger value 440, method 500 returns to block 606 to continue polling the environmental event sources 205 for environmental event data 212, 222 and 232. In response to at least one of the environmental event values 438 being outside of the pre-determined threshold, specification or action trigger value 440, management controller 150 identifies at least one environmental event action 442 from environmental event action data 430 (block 620). Management controller 150 logs the environmental event action 442 to a log file (block 622). The logging of the environmental event action 442 to the log file provides a user or system administrator with a notification and record that an environmental event action has occurred. Management controller 150 triggers at least one of IHS 100, servers 310, blades 320 or secondary IHS 330 to perform the selected environmental event action 442 (block 624). Method 600 then ends.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method for controlling an information handling system (IHS) in response to an environmental event, the method comprising:
   a management controller dynamically polling at least one environmental event source for environmental event data;
   receiving the environmental event data from the environmental event source;
   identifying a first environmental event value within the environmental event data;
   determining if the first environmental event value is outside of a threshold specification; and
   in response to the first environmental event value being outside of the threshold specification:
      identifying a first action associated with the first environmental event value; and
      triggering the IHS to perform the first action that protects the IHS or another communicatively-coupled IHS from damages and/or data loss potentially caused by the environmental event.

2. The method of claim 1, wherein triggering the IHS to perform the first action further comprises:
   transmitting the first action associated with the first environmental event value to at least one of a server, a blade, or another communicatively-coupled IHS; and
   triggering at least one of the server, the blade, or the another communicatively coupled IHS to perform the first action.

3. The method of claim 1, further comprising:
   comparing the first environmental event value to a previously saved second environmental event value; and
   in response to the first environmental event value being different from the second environmental event value, replacing the second environmental event value with the first environmental event value.

4. The method of claim 1, wherein the environmental event data comprises at least one of:
   a flood;
   a tornado;
   a hurricane;
   a storm warning;
   a fire; and
   an earthquake.

5. The method of claim 1, wherein the first action comprises at least one action from among:
   throttling power to the IHS;
   backing up data of the IHS;
   shutting down the IHS;
   migrating the IHS to another IHS;
   operating the IHS in a maintenance mode; and
   operating the IHS in an acoustic mode.

6. The method of claim 1, wherein:
the environmental event source comprises at least one of: a sensor; a monitoring server; and an external communication source; and
the environmental event data comprises at least one of: a power failure; and a cooling system failure.

7. The method of claim 1, further comprising:
retrieving at least one environmental event source;
transmitting authentication data to the environmental event source to authenticate the sending IHS; and
provided the environmental event source authenticates the sending IHS, receiving the environmental event data from the environmental event source.

8. The method of claim 1, further comprising:
detecting the at least one environmental event source; and
in response to at least one of the environmental event sources being detected, displaying the detected environmental event source on a display device associated with the IHS.

9. The method of claim 8, further comprising:
receiving a user selection of the environmental event source displayed on the display device;
assigning a source identifier to the selected environmental event source; and
storing the source identifier and a name of the selected environmental event source to an environmental event source database.

10. The method of claim 9, further comprising:
displaying at least one action associated with the environmental event source;
receiving a user selection of the action to associate with the environmental event source from among the at least one action displayed; and
storing the action to an entry corresponding to the environmental even source within the environmental event action database.

11. An information handling system (IHS) comprising:
a management controller;
a memory communicatively coupled to the management controller via a system interconnect, the management controller having firmware executing thereon to enable control of the IHS in response to an environmental event, wherein the firmware configures the management controller to:
dynamically poll at least one environmental event source for environmental event data;
receive the environmental event data from the environmental event source;
identify a first environmental event value within the environmental event data;
determine if the first environmental event value is outside of a threshold specification;
in response to the first environmental event value being outside of the threshold specification, identify a first action associated with the first environmental event value; and
trigger the IHS to perform the first action that protects the IHS or another communicatively-coupled IHS from damages and/or data loss potentially caused by the environmental event.

12. The information handling system of claim 11, wherein triggering the IHS to perform the first environmental event action includes the firmware further configuring the management controller to:
transmit the first action associated with the first environmental event value to at least one of a server, a blade, or another communicatively coupled IHS; and
trigger at least one of the server, the blade, or the other communicatively coupled IHS to perform the first action.

13. The information handling system of claim 11, wherein the firmware further configures the management controller to:
compare the first environmental event value to a previously saved second environmental event value; and
in response to the first environmental event value being different from the second environmental event value, replace the second environmental event value with the first environmental event value.

14. The information handling system of claim 11, wherein the environmental event data comprises at least one of:
a power failure;
a flood;
a tornado;
a hurricane;
a cooling system failure;
a storm warning;
a fire; and
an earthquake.

15. The information handling system of claim 11, wherein the first action comprises at least one of:
throttling power to the IHS;
backing up data of the IHS;
shutting down the IHS;
migrating the IHS to another IHS;
operating the IHS in a maintenance mode; and
operating the IHS in an acoustic mode.

16. The information handling system of claim 11, wherein the environmental event source comprises at least one of:
a sensor;
a monitoring server; and
an external communication source.

17. The information handling system of claim 11, wherein the firmware further configures the management controller to:
retrieve at least one environmental event source;
transmit authentication data to the environmental event source to authenticate the sending IHS; and
provided the environmental event source authenticates the sending IHS, receive the environmental event data from the environmental event source.

18. The information handling system of claim 11, wherein the firmware further configures the management controller to:
detect the at least one environmental event source; and
in response to at least one of the environmental event sources being detected, display the detected environmental event source on a display device associated with the IHS.

19. The information handling system of claim 18, wherein the firmware further configures the management controller to:
receive a user selection of the environmental event source displayed on the display device;
assign a source identifier to the selected environmental event source; and
store the source identifier and a name of the selected environmental event source to an environmental event source database.

20. The information handling system of claim 19, wherein the firmware further configures the management controller to:
display at least one action associated with the environmental event source;

receive a user selection of the action to associate with the environmental event source from among the at least one action displayed; and store the action to an entry corresponding to the environmental even source within the environmental event action database.

\* \* \* \* \*